(12) United States Patent
Benhase et al.

(10) Patent No.: US 9,658,888 B2
(45) Date of Patent: May 23, 2017

(54) THRESHOLDING TASK CONTROL BLOCKS FOR STAGING AND DESTAGING

(71) Applicant: INTERNATIONAL BUSINESS MACHINES CORPORATION, Armonk, NY (US)

(72) Inventors: Michael T. Benhase, Tucson, AZ (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 962 days.

(21) Appl. No.: 13/958,852

(22) Filed: Aug. 5, 2013

(65) Prior Publication Data

US 2015/0040135 A1 Feb. 5, 2015

(51) Int. Cl.
*G06F 9/46* (2006.01)
*G06F 9/50* (2006.01)

(52) U.S. Cl.
CPC .... *G06F 9/5016* (2013.01); *G06F 2209/5014* (2013.01)

(58) Field of Classification Search
None
See application file for complete search history.

(56) References Cited

U.S. PATENT DOCUMENTS

| 7,383,404 | B2 | 6/2008 | Barnes et al. |
| 2005/0240928 | A1* | 10/2005 | Brown ................ G06F 9/5011 718/100 |
| 2007/0271566 | A1* | 11/2007 | Greiner .............. G06F 9/30003 718/100 |
| 2009/0222621 | A1 | 9/2009 | Ash et al. |
| 2013/0132667 | A1 | 5/2013 | Benhase et al. |

* cited by examiner

*Primary Examiner* — Kenneth Tang
(74) *Attorney, Agent, or Firm* — Griffiths & Seaton PLLC

(57) ABSTRACT

For thresholding task control blocks (TCBs) for staging and destaging, a first tier of TCBs are reserved for guaranteeing a minimum number of TCBs for staging and destaging for storage ranks. An additional number of requested TCBs are apportioned from a second tier of TCBs to each of the storage ranks based on a scaling factor that is calculated at predefined time intervals.

14 Claims, 4 Drawing Sheets

THRESHOLDING TASK CONTROL BLOCKS FOR STAGING AND DESTAGING

BACKGROUND OF THE INVENTION

Field of the Invention

The present invention relates in general computing systems, and more particularly to, systems and methods for thresholding task control blocks (TCBs) for staging and destaging.

Description of the Related Art

In today's society, computer systems are commonplace. Computer systems may be found in the workplace, at home, or at school. Computer systems may include data storage systems, or disk storage systems, to process and store data. Contemporary computer storage systems are known to destage storage tracks from cache to long-term storage devices so that there is sufficient room in the cache for data to be written. When destaging the storage tracks, contemporary storage systems destage the storage tracks from each rank in the cache when the cache is becoming full or the global pressure factor is high. That is, storage tracks are destaged from each rank when the global pressure factor is high, even though some ranks in the cache may only be storing a small number of storage tracks with respect to the amount of storage space allocated to these ranks. Moreover, destaging tasks assist with starting the destaging of storage tracks to the storage systems.

SUMMARY OF THE INVENTION

In one embodiment, a method is provided for thresholding task control blocks (TCBs) for staging and destaging using at least one processor device in a computing environment. In one embodiment, by way of example only, a first tier of TCBs are reserved for guaranteeing a minimum number of TCBs for staging and destaging for storage ranks. An additional number of requested TCBs are apportioned from a second tier of TCBs to each of the storage ranks based on a scaling factor that is calculated at predefined time intervals.

In another embodiment, a computer system is provided for thresholding task control blocks (TCBs) for staging and destaging using at least one processor device, in a computing environment. The computer system includes a computer-readable medium and a processor in operable communication with the computer-readable medium. In one embodiment, by way of example only, the processor uses a first tier of TCBs for reserving a guaranteed minimum number of TCBs for storage ranks, and apportions an additional number of the TCBs from a second tier of TCBs that are requested to one of the storage ranks based on a scaling factor that is calculated at predefined time intervals.

In a further embodiment, a computer program product is provided for thresholding task control blocks (TCBs) for staging and destaging using at least one processor device, in a computing environment. The computer-readable storage medium has computer-readable program code portions stored thereon. The computer-readable program code portions include a first executable portion that uses a first tier of TCBs for reserving a guaranteed minimum number of TCBs for storage ranks, and apportions an additional number of the TCBs from a second tier of TCBs that are requested to one of the storage ranks based on a scaling factor that is calculated at predefined time intervals.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
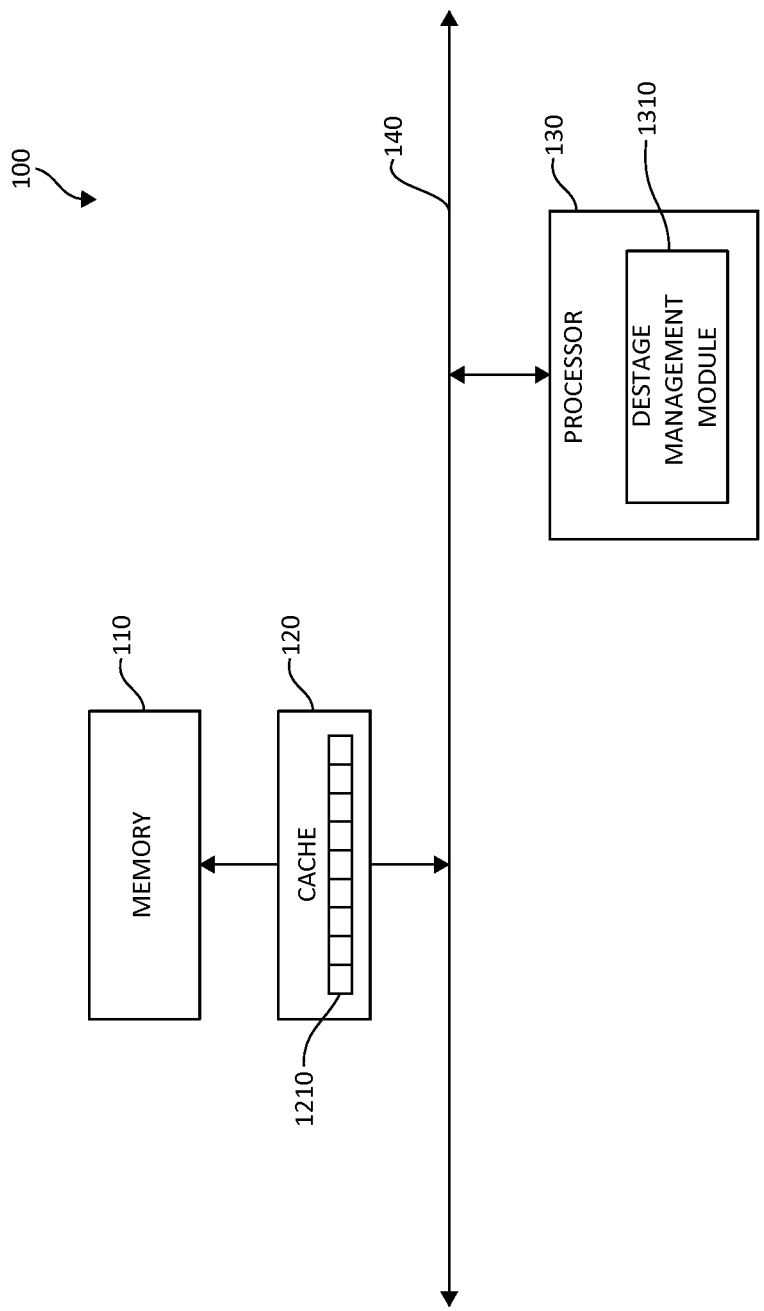
FIG. 1 illustrates is a block diagram showing an exemplary hardware structure for smoothing destaging tasks in which aspects of the present invention may be realized.

In one embodiment, data storage and retrieval systems receives requests to write information to one or more secondary storage devices, and requests to retrieve information from those one or more secondary storage devices. Upon receipt of a write request, computing systems store information received from a host computer in a data cache. In one embodiment, a copy of that information is also stored in NVS. The NVS may be used as temporary storage for data in the process of being written to secondary storage devices so that data will be available in the event that the host computer systems or the data storage and retrieval systems fail during the process of storing data. Upon receipt of a read request, the system recalls information from the one or more secondary storage devices and moves that information to the data cache and then to the host. In one embodiment, a storage controller may control one or more storage devices that may include hard disks, tapes, etc. A cache may also be maintained by the storage controller, where the cache may comprise a high speed storage that is accessible more quickly in comparison to certain other storage devices, such as, hard disks, tapes, etc. However, the total amount of storage capacity of the cache may be relatively smaller in comparison to the storage capacity of certain other storage devices, such as, hard disks, etc., that are controlled by the storage controller. The cache may be comprised of one or more of random access memory (RAM), the NVS, read cache, write cache, etc., that may interoperate with each other in different ways. The NVS may be comprised of a battery backed-up random access memory and may allow write operations to be performed at a high speed. The storage controller may manage Input/output (I/O) requests from networked hosts to the plurality of storage devices.

In one embodiment, the data storage and retrieval systems may be continuously moving information to and from storage devices, to and from the data cache and in certain circumstances to and from the NVS. Task control blocks ("TCBs") are used to manage the movement of data within a data storage and retrieval system and between, for example, a host computer and the data storage and retrieval system. TCBs are passed between various processes within the data storage and retrieval system to clear space for and manage the movement of the data to be stored or retrieved.

In one embodiment, the computer storage systems are known to destage storage tracks from cache to long-term storage devices so that there is sufficient room in the cache for data to be written. In one embodiment, Wise Ordering for Writes (WOW), which are lists that are used for exploiting both temporal and spatial locality by ordering the list according to the storage location to which an associated task or request is directed, add a destaging, or simply "destaging tasks" one at a time. In one embodiment, destaging tasks are used to manage the movement of data within a data storage and retrieval system and between a host computer and the data storage and retrieval system. In other words, the destage TCBs are tasks that destage tracks from a cache to storage (e.g., disk drives). The destaging TCBs may be a command to start the destaging of the storage track.

Caching techniques implemented by the storage controller assist in hiding I/O latency. The cache may comprise a high speed memory or storage device used to reduce the effective time required to read data from or write data to a lower speed memory or device. The cache is used for rapid access to data staged from external storage to service read data access requests, and to provide buffering of modified data. Write requests are written to the cache and then written (i.e., destaged) to the external storage devices. NVS was introduced for allowing fast writes. In the absence NVS, data writes may have to be synchronously written (i.e., destaged) directly to the storage device to ensure consistency, correctness, and persistence. Otherwise failure of the server may cause data stored in the cache to be lost. The rate of host writes exceeds the speed of the storage devices, hence without NVS the rate of data transfer to storage devices may be slow. In one embodiment, the NVS enables fast writes to cache where the writes are mirrored to and stored safely in the NVS until the writes can be transferred to the external storage device. The data is destaged from cache later (and discarded from NVS) in an asynchronous fashion thus hiding the write latency of the storage device. The cache and NVS typically store updates intended for multiple storage devices. To guarantee continued low latency for writes, the data in the NVS may have to be drained so as to ensure that there is always some empty space for incoming writes; otherwise, follow-on writes may become effectively synchronous, which may adversely impact the response time for host writes. On the other hand, if the writes are drained too aggressively, then the benefits of write caching may not be fully exploited since the average amount of NVS cache utilized may be low.

In one embodiment, the TCBs may be a data structure in the operating system kernel containing the information needed to manage a particular process. The storage controllers may move information to and from storage devices, and to and from the cache (including the NVS) by using TCBs to manage the movement of data. When a write request issues from a host computer to a storage controller, a TCB may be allocated from the operating system code. The TCB is used to maintain information about the write process from beginning to end as data to be written is passed from the host computer through the cache to the secondary storage devices. If the cache is full, the TCB may be queued until existing data in the cache can be destaged (i.e., written to secondary storage devices), in order to free up space. The destage operations may involve the moving of information from cache to a RAID rank and destaged TCBs may be allocated for performing the destage operations.

However, a storage controller is limited number of TCBs (e.g., 12 thousand). Also, the storage controller may have a large number of storage ranks ("ranks") (e.g., 400). Some of the ranks can saturate the disks by smaller number of destage/stage tasks. For example, spinners only need 40 destage/stage TCBs to drive the disks to saturation. However, solid disk drives (SSD) ranks and other types of ranks may need more destage/stage tasks to saturate the disks. For example, certain ranks (e.g., bluehawk rank) may take up to 120 stage/destage TCBs to get maximum input/output per seconds (IOPS). If there are a significant amount of certain types of ranks (e.g., the bluehawk ranks) and each is running at a maximum rate then the box can easily max out on the number of TCBs. Thus, a need exists for allocating, thresholding, and/or apportioning the TCBs (e.g., destaging TCBs and staging TCBs) to the various ranks to ensure computing efficiency.

Thus, in one embodiment, by way of example only, the present invention provides a solution for thresholding task control blocks (TCBs) for staging and destaging using at least one processor device in a computing environment. In one embodiment, by way of example only, a first tier of TCBs are reserved for guaranteeing a minimum number of TCBs for staging and destaging for storage ranks. An additional number of requested TCBs are apportioned from a second tier of TCBs to each of the storage ranks based on a scaling factor that is calculated at predefined time intervals.

In one embodiment, the present invention provides for allocation of the TCB for the various ranks by providing 2 tiers of TCBs. A first tier (e.g., tier 0) guarantees a minimum number of TCBs to every rank, and a second tier (e.g., tier 1) of TCBs requests are apportioned by rank based on a scaling factor, which is recalculated at short intervals, and those ranks over their limit are reduced. First, two tiers of TCBs are used; a first tier and a second tier. Each rank reserve both stage TCBs and destage TCBs in the first tier (e.g., tier 0) whether the rank is in an idle state and/or a running state. In this way, when a rank starts running, the rank may easily use and/or request (e.g., grab) some of the reserved and guaranteed TCBs without having to wait for other ranks to give up (e.g., release and free up) some their TCBs.

In one embodiment, each of the running ranks (e.g., those ranks operating in the running/operating state) computes how many stage TCBs and/or destage TCBs they need based on rank type, staging and/or destage operations, read requests and destages needed based on NVS usage. Each rank receives and/or is assigned a minimum number of TCBs from the first tier (e.g., tier 0). If a rank computes that it needs more than this number, then the TCBs are allocated from the second tier (e.g., tier 1). Periodically, the present invention adds up all of the requests from all of the ranks that need to be satisfied and/or allocated from the second tier (e.g., tier 1). A scaling factor is then computed based on number of requests from the second tier (e.g., tier 1) and the actual number of TCBs in the second tier (e.g., tier 1). In one embodiment, the present invention multiplies the scaling factor by the number of requests from each rank for TCBs from the second tier (e.g., tier 1). This is the actual number of TCBs (e.g., the maximum number of TCBs) that each rank should use and be allocated. If a rank is running TCBs above this maximum number of TCBs than the present invention (e.g., the rank) frees (e.g., releases) at least one or more of the TCBs (e.g., the staging TCBs and/or destaging TCBs) to get to this maximum number of TCBs. If a rank is running TCBs below this maximum number of TCBs than the present invention (e.g., the rank) may allocate more of the TCBs (staging TCBs and/or destaging TCBs).

To handle and/or prevent a burst of allocating the TCBs where a first half/portion of the ranks are in the running state with the maximum number of TCBs are TCBs=X, and a second portion/half of the ranks start Running so the maximum number of TCBs are TCBs=X/2). In one embodiment, the present invention does not allow the second half of the ranks to increase TCBs, until the first half of the ranks have decreased TCBs.

Turning to FIG. 1, a block diagram of one embodiment of a system 100 for smoothing destaging tasks. At least in the illustrated embodiment, system 100 comprises a memory 110 coupled to a cache 120 and a processor 130 via a bus 140 (e.g., a wired and/or wireless bus).

Memory 110 may be any type of memory device known in the art or developed in the future. Examples of memory 110 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 110, storage tracks are capable of being stored in memory 110. Furthermore, each of the storage tracks can be destaged to memory 110 from cache 120 when data is written to the storage tracks.

Cache 120, in one embodiment, comprises a write cache partitioned into one or more ranks 1210, where each rank 1210 includes one or more storage tracks. Cache 120 may be any cache known in the art or developed in the future.

During operation, the storage tracks in each rank 1210 are destaged to memory 110 in a foreground destaging process after the storage tracks have been written to. That is, the foreground destage process destages storage tracks from the rank(s) 1210 to memory 110 while a host (not shown) is actively writing to various storage tracks in the ranks 1210 of cache 120. Ideally, a particular storage track is not being destaged when one or more hosts desire to write to the particular storage track, which is known as a destage conflict.

In various embodiments, processor 130 comprises or has access to a destage management module 1310, which comprises computer-readable code that, when executed by processor 130, causes processor 130 to perform the present invention. In the various embodiments, processor 130 is configured to calculate the number of destaging tasks according to either a standard time interval and a variable recomputed destaging task interval.

In various other embodiments, processor 130 is configured to either ramp up and/or ramp down the destaging tasks and the current number of destaging task.

In various other embodiments, processor 130 is configured to either decrement the current number of destaging tasks by a value of one, if greater than the desired number of destaging tasks and/or increment the current number of destaging tasks by a value of one, if less than the desired number of destaging tasks. Subsequent to either decrementing or incrementing, the processor 130 is configured to recalculate the current number of destaging tasks after reaching either the standard time interval and the variable recomputed destaging task interval that is selected for the calculating.

In one embodiment, each rank 1210 is allocated the same predetermined amount of storage space in cache 120. In another embodiment, at least two ranks 1210 are allocated different predetermined amounts of storage space in cache 120. In still another embodiment, each rank 1210 is allocated a different predetermined amount of storage space in cache 120. In each of these embodiments, each predetermined amount of storage space in cache 120 is not to exceed a predetermined maximum amount of storage space.

In various embodiments, processor 130 is configured to allocate the predetermined maximum amount of storage space on a percentage basis. In one embodiment, the predetermined maximum amount of storage space allocated to a respective rank 1210 is in the range of about one percent to about twenty-five percent (1%-50%) of the total storage capacity of cache 120. In another embodiment, the predetermined maximum amount of storage space allocated to a respective rank 1210 is twenty-five percent (25%) of the total storage capacity of cache 120.

In various other embodiments, processor 130 is configured to allocate the predetermined maximum amount of storage space on a storage track basis. That is, each rank 1210 is limited to a predetermined maximum number of storage tracks, which can vary from rank to rank.

Processor 130, in various embodiments, is configured to monitor each rank 1210 in cache 120 and determine the amount of storage tracks each respective rank 1210 is storing with respect to its allocated amount of storage space in cache 120. In one embodiment, processor 130 is configured to determine the amount of storage tracks in each respective rank 1210 on a percentage basis. That is, processor 130 is configured to monitor each rank 1210 and determine the percentage each respective rank 1210 is using to store storage tracks with respect to the individual allocations of the total storage space in cache 120.

In another embodiment, processor 130 is configured to determine the number of storage tracks in each respective rank 1210. Specifically, processor 130 is configured to monitor each rank 1210 and determine the number of storage tracks each respective rank 1210 is using to store storage tracks with respect to the individual allocations of the total storage space in cache 120.

Processer 130, in various embodiments, is configured to destage storage tracks from each respective rank 1210 until a predetermined minimum amount of storage space remains in each respective rank 1210 with respect to its predetermined allocated amount of storage space in cache 120, and then cease to or no longer destage storage tracks from ranks 1210 that are using less than or equal to the predetermined minimum amount of storage space. In one embodiment, processor 130 is configured to destage storage tracks from each rank 1210 until a predetermined percentage (e.g., thirty percent (30%)) of the predetermined amount of storage space in cache 120 is reached. In another embodiment, processor 130 is configured to destage storage tracks from each rank 1210 until a predetermined minimum number of storage tracks are reached.

For example, in an embodiment that includes ten (10) ranks 1210 in which each rank 1210 is allocated 10 percent (10%) of the total storage space of cache 120 and the predetermined minimum amount of storage tracks is thirty percent (30%), processor 130 will continue to destage storage tracks from each rank 1210 that includes more than three percent (3%) of the total storage capacity of cache 120 (i.e., 10%×30%=3%). Once a particular rank 1210 has reached the three percent threshold, processor 130 will cease to or no longer destage storage tracks from the particular storage track until the particular rank 1210 is using more than the predetermined amount of storage tracks is (i.e., three percent of the total storage capacity of cache 120 in this example).

Processor 130, in various embodiments, is configured to utilize a formula to determine the number of destage tasks to utilize when destaging storage tracks from each respective rank 1210. In the various embodiments, the formula is based on the global pressure factor of cache 120 as it relates to each respective rank 1210. That is, the number of destage tasks utilized to destage storage tracks from each respective rank 1210 is proportional to the amount of its allocated storage space each respective rank 1210 is multiplied by the global pressure factor, which is a factor determined by a collective percentage of the total amount of storage space in cache 120 being utilized by ranks 1210.

In one embodiment, the formula includes a predetermined maximum number destage tasks (e.g., forty (40) destage tasks) that is utilized when a particular rank 1210 is utilizing a large amount of its allocated storage space and the global pressure factor is high. In another embodiments, the formula includes a default of zero (0) destage tasks that is utilized when a particular rank 1210 is utilizing an amount of storage space less than or equal to the predetermined minimum amount with respect to its allocated amount of storage space in cache 120.

Processor 130, in various embodiments, is configured to select tracks for destaging from a least recently used (LRU) list and move the selected tracks to a destaging wait list. The selected tracks, via the processor 130, are grouped and destaged from the destaging wait list.

Figure 2:
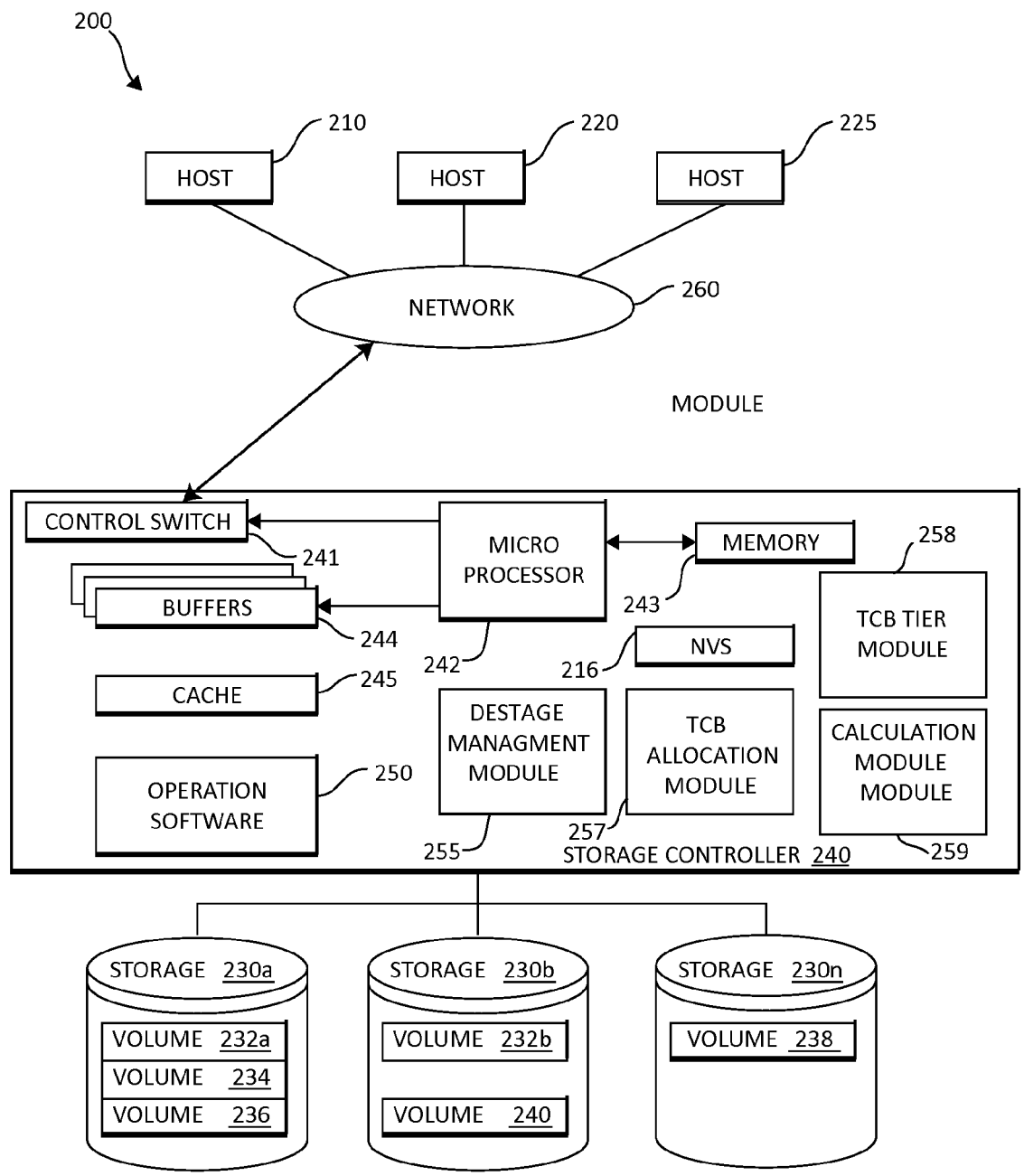
FIG. 2 is a block diagram showing an exemplary hardware structure of a data storage system in a computer system according to the present invention in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230. In one embodiment, the embodiments described herein may be applicable to a variety of types of computing architectures, such as in a virtual cluster management environment using the various embodiments as described herein.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores the operation software 250, program instructions and data, which the processor 242 may access for executing functions and method steps associated with managing storage 230, and executing the steps and methods of the present invention. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a destage management module 255, a task control block (TCB) allocation module 257, a TCB TIER module 258, and a calculation module 259. The destage management module 255, the TCB allocation module 257, the TCB TIER module 258, and the calculation module 259 may be one complete module functioning simultaneously or separate modules. The destage management module 255, the TCB allocation module 257, the TCB TIER module 258, and the calculation module 259 may have some internal memory (not shown) and may store unprocessed, processed, or "semi-processed" data. The destage management module 255, the TCB allocation module 257, the TCB TIER module 258, and the calculation module 259 may work in conjunction with each and every component of the storage controller 240, the hosts 210, 220, 225, and other storage controllers 240 and hosts 210, 220, and 225 that may be remotely connected via the storage fabric 260. Both the destage management module 255, the TCB allocation module 257, the TCB TIER module 258, and the calculation module 259 may be structurally one complete module or may be associated and/or included with other individual modules. The destage management module 255, the TCB allocation module 257, the TCB TIER module 258, and the calculation module 259 may also be located in the cache 245 or other components of the storage controller 240.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, a control switch 241 for controlling a protocol to control data transfer to or from the destage management module 255, the TCB allocation module 257, the TCB TIER module 258, and the calculation module 259 in which information may be set. Multiple buffers 244 may be implemented to assist with the methods and steps as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." The microprocessor 242 may control the memory 243 to store command information from the cluster host/node device (physical or virtual) 210 and information for identifying the cluster host/node device (physical or virtual) 210. The control switch 241, the buffers 244, the cache 245, the operating software 250, the microprocessor 242, memory 243, NVS 216, the destage management module 255, the TCB allocation module 257, the TCB TIER module 258, and the calculation module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

Figure 3:
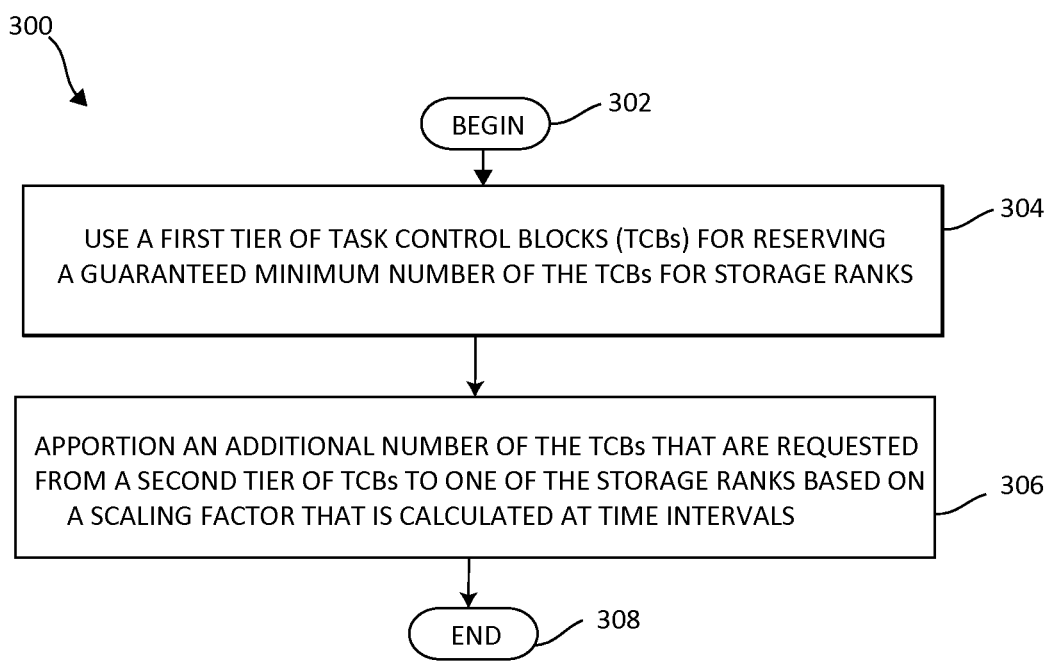
FIG. 3 is a flowchart illustrating an exemplary method for thresholding task control blocks (TCBs) for staging and destaging in which aspects of the present invention may be realized.

Turning to FIG. 3, a flowchart illustrates an exemplary method 300 for thresholding task control blocks (TCBs) for staging and destaging is depicted. The method 300 begins (step 302). The method 300 uses a first tier of TCBs for reserving a guaranteed minimum number of TCBs for storage ranks (step 304). The method 300 apportions an additional number of the TCBs from a second tier of TCBs that are requested to one of the storage ranks based on a scaling factor that is calculated at predefined time intervals (step 306). The method 300 ends (step 308).

In one embodiment, the first tier of TCBs (e.g., Tier 0) are in an idle state and the second tier of TCBs (e.g., Tier 1) are running. The first tier of idle TCBs (e.g., Idle(Tier0)) allows any rank to become non idle. In one embodiment, there may be only a few TCBs in the idle pool of TCBs. Any TCBs that are not in use are reserved (not used) for guaranteeing a minimum number of TCBs for storage ranks (e.g., 2K TCBs/owned ranks).

In one embodiment, for the second tier of TCBs (e.g., Tier 1) of running TCBs, the present invention determines and identifies a total number of TCB requests from the second tier of TCBs (e.g., Tier 1). The present invention scales the individual rank requests for TCBs from the second tier of TCBs (e.g., Tier 1) by a ratio of a total number of TCBs in the second tier of TCBs (e.g., Tier 1) divided by a total number of TCBs requests from tier 1 (e.g., as Scaling Ratio=Total number of TCBs/Total TCB Requests). The TCBs requests are summed from the second tier of TCBs (e.g., Tier 1) for all the storage running ranks (e.g., e.g. 4K TCBs are summed for the running ranks. The present invention saves a maximum number of TCBs for each rank based on the first tier of TCBs (e.g., Tier 0) and TCBs needed from the second tier of TCBs (e.g., Tier 1) that is then multiplied by the scaling ratio.

Any rank running over the maximum number of TCBs computed releases and/or frees stage and/or destage TCBs. Ranks with fewer than the maximum number of TCBs computed may allocate more stage TCBs and/or destage TCBs in order to operate at the maximum number of TCBs. The present invention handle a burst (i.e. first half the Ranks are Running, Max TCBx==X, second half of the Ranks start Running, Max TCBs==X/2). The present invention does not allow the second half of the ranks to increase the TCBs, until the first half of the ranks have decreased TCBs.

Figure 4:
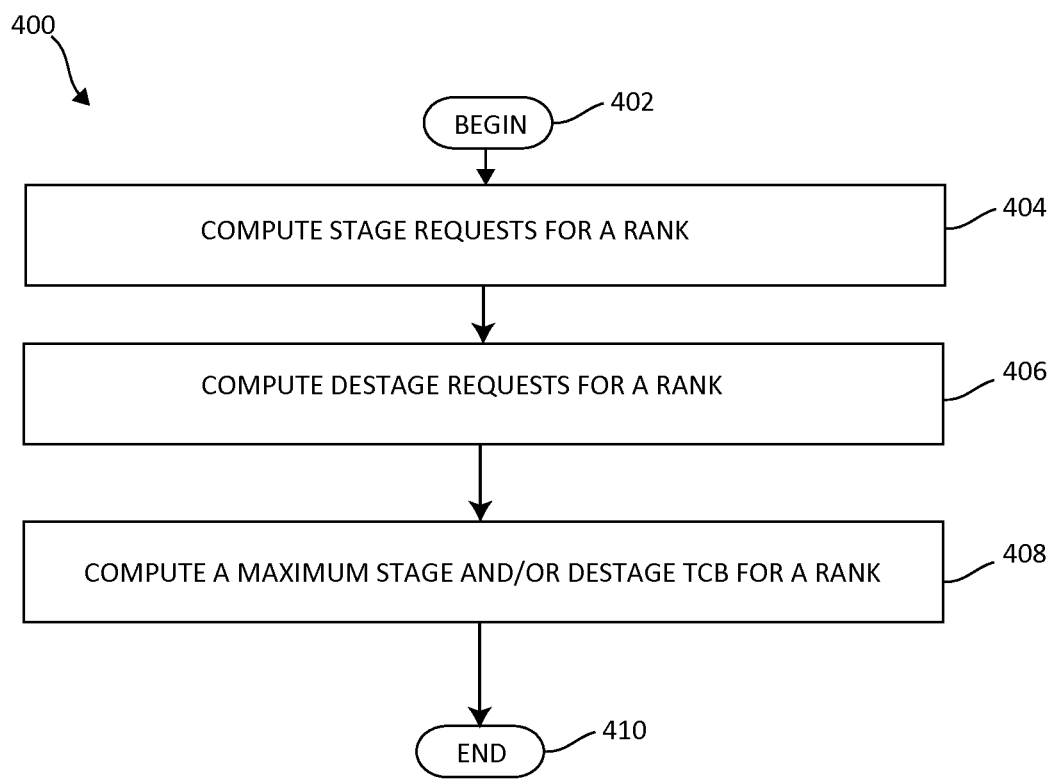
FIG. 4 is a flow chart illustrating an additional exemplary method for computing staging and destaging task control blocks (TCBs) for allocation to ranks in which aspects of the present invention may be realized.

Turning to FIG. 4, a flowchart illustrates an additional exemplary method 400 for computing staging and destaging task control blocks (TCBs) for allocation to ranks is depicted. The method 400 begins (step 402). The method 400 computes stage requests for a rank (step 404). The method 400 computes destage requests for a rank (step 406). The method 400 computes a maximum stage TCBs and/or maximum destage TCBs for a rank (step 408). The method 400 ends (step 410). Further details for computing staging and destaging task control blocks (TCBs) for allocation to ranks are provided below.

In one embodiment the present invention provides a solution for computing the stage TCB requests for a rank. The stage requests are computed as a number of stages in progress plus (add) the number of waiting ranks for stage TCBs. In one embodiment the present invention provides a solution for computing destage TCB requests for a rank based on a total NVS usage and a rank's use of the NVS space.

In one embodiment, the present invention periodically computes a maximum stage TCBs and/or maximum destage TCBs for a rank. In one embodiment, the first tier of TCBs (e.g., Tier 0) requests are computed as a number of the first tier of TCBs (e.g., Tier 0) divided by a number of the ranks. For all ranks, if either of stage TCBs and/or destage TCBs are greater than the maximum stage TCBs and/or maximum destage TCBs, then present invention sets the ranks to conform to the maximum stage TCBs and/or maximum destage TCBs (e.g., setting the ranks to false). The present invention sets the ranks requested number of stage TCBs and/or destage TCBs to a minimum number of the rank requests and the first tier of TCBs (e.g., Tier 0) requests. The total number of the stage TCBs and/or destage TCBs requests are updated by adding a rank's number of the stage TCBs and/or destage TCBs requests. If any rank does not conform to the maximum stage TCBs and/or maximum destage TCBs then if some ranks are running with stage/destage TCBs at more than the current maximum stage TCBs and/or maximum destage TCBs then the present invention pauses and/or does not proceed. When all ranks conform to the max than the algorithm will be repeated again and new ranks can retrieve and/or obtain more stage TCBs and/or destage TCBs.

In one embodiment, the present invention computes the second tier of TCBs (e.g., Tier 1) requests by adding all requests for TCBs and then subtracts number of the first tier of TCBs (e.g., Tier 0). The TCB scaling factor is computed as the minimum of at least 100 and/or the number of the second tier of TCBs (e.g., Tier 1) divided by the total number of the second tier of TCBs (e.g., Tier 1) requests.

For all ranks, the present invention sets the maximum stage TCBs and/or maximum destage TCBs as the first tier of TCBs (e.g., Tier 0) requests plus (+) the number of requests that can be satisfied from the second tier of TCBs (e.g., Tier 1) TCBs using the scaling factor (e.g., max TCBs=tier 0 requests+(tier1 requests*scaling factor)).

In one embodiment, provides a solution for thresholding task control blocks (TCBs) for staging and destaging using at least one processor device in a computing environment. In one embodiment, by way of example only, a first tier of TCBs are reserved for guaranteeing a minimum number of TCBs for staging and destaging for storage ranks. An additional number of requested TCBs are apportioned from a second tier of TCBs to each of the storage ranks based on a scaling factor that is calculated at predefined time intervals. In one embodiment, the present invention determines a number of TCBs for one of staging and destaging that are required by one of the storage ranks in a running state based a storage rank type, staging operation and/or destaging operations, read requests, and/or destage operations needed based on non-volatile storage (NVS) usage. In one embodiment, provides a solution for computing the scaling factor by using requests from each of the storage ranks and a total number of TCBs in the second tier of TCBs.

The scaling factor is multiplied by a total number of the requests from each of the storage ranks for the TCBs from the second tier of TCBs for determining a maximum number of the TCBs to be allocated to each of the storage ranks In one embodiment, the present invention frees and/or releases at least one of the TCBs by those storage ranks executing a number of the TCBs above the maximum number of the TCBs in order to execute only the maximum number of the TCBs. An additional number of the TCBs are apportioned from the second tier of TCBs until reaching the maximum number of the TCBs to those storage ranks executing a number of the TCBs below the maximum number of the TCBs.

In one embodiment, the present invention prevents at least a first portion of the storage ranks from increasing the TCBs until a second portion of storage ranks have decreased the TCBs for preventing a burst. In one embodiment, the TCBs of the second portion of storage ranks must decrease by half of the running TCBs of the second portion prior to the first portion of storage ranks increasing any number of the TCBs on the first portion of storage ranks.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for thresholding task control blocks (TCBs) for staging and destaging by a processor device in a computing environment, the method comprising:
   using a first tier of TCBs for reserving a guaranteed minimum number of TCBs for storage ranks;
   apportioning an additional number of the TCBs from a second tier of TCBs that are requested to one of the storage ranks based on a scaling factor that is calculated at predefined time intervals;
   computing the scaling factor by using a plurality of requests from each of the storage ranks and a total number of TCBs in the second tier of TCBs; and
   multiplying the scaling factor by a total number of the plurality of requests from each of the storage ranks for the TCBs from the second tier of TCBs for determining a maximum number of the TCBs to be allocated to each of the storage ranks.

2. The method of claim 1, further including determining a number of TCBs for one of staging and destaging that are required by one of the storage ranks in a running state based on one of a storage rank type, one of a staging operation and destaging operation, read requests, and destage operations needed based on non-volatile storage (NVS) usage.

3. The method of claim 1, further including freeing at least one of the TCBs by those storage ranks executing a number of the TCBs above the maximum number of the TCBs in order to execute only the maximum number of the TCBs.

4. The method of claim 3, further including apportioning the additional number of the TCBs from the second tier of TCBs until reaching the maximum number of the TCBs to those storage ranks executing a number of the TCBs below the maximum number of the TCBs.

5. The method of claim 1, further including preventing at least a first portion of the storage ranks from increasing the TCBs until a second portion of storage ranks have decreased the TCBs for preventing a burst.

6. A system for thresholding task control blocks (TCBs) for staging and destaging in a computing environment, the system comprising:
   at least one processor device operable in the computing environment, wherein processor device:
   uses a first tier of TCBs for reserving a guaranteed minimum number of TCBs for storage ranks,
   apportions an additional number of the TCBs from a second tier of TCBs that are requested to one of the storage ranks based on a scaling factor that is calculated at predefined time intervals,
   computes the scaling factor by using a plurality of requests from each of the storage ranks and a total number of TCBs in the second tier of TCBs, and
   multiplies the scaling factor by a total number of the plurality of requests from each of the storage ranks for the TCBs from the second tier of TCBs for determining a maximum number of the TCBs to be allocated to each of the storage ranks.

7. The system of claim 6, wherein the at least one processor device determines a number of TCBs for one of staging and destaging that are required by one of the storage ranks in a running state based on one of a storage rank type, one of a staging operation and destaging operation, read requests, and destage operations needed based on non-volatile storage (NVS) usage.

8. The system of claim 6, wherein the at least one processor device frees at least one of the TCBs by those storage ranks executing a number of the TCBs above the maximum number of the TCBs in order to execute only the maximum number of the TCBs.

9. The system of claim 8, wherein the at least one processor device apportions the additional number of the TCBs from the second tier of TCBs until reaching the maximum number of the TCBs to those storage ranks executing a number of the TCBs below the maximum number of the TCBs.

10. The system of claim 6, wherein the at least one processor device prevents at least a first portion of the storage ranks from increasing the TCBs until a second portion of storage ranks have decreased the TCBs for preventing a burst.

11. A computer program product for thresholding task control blocks (TCBs) for staging and destaging in a computing environment by at least one processor device, the computer program product comprising a non-transitory computer-readable storage medium having computer-readable program code portions stored therein, the computer-readable program code portions comprising:
- a first executable portion that uses a first tier of TCBs for reserving a guaranteed minimum number of TCBs for storage ranks;
- a second executable portion that apportions an additional number of the TCBs from a second tier of TCBs that are requested to one of the storage ranks based on a scaling factor that is calculated at predefined time intervals;
- a third executable portion that computes the scaling factor by using a plurality of requests from each of the storage ranks and a total number of TCBs in the second tier of TCBs; and
- a fourth executable portion that multiplies the scaling factor by a total number of the plurality of requests from each of the storage ranks for the TCBs from the second tier of TCBs for determining a maximum number of the TCBs to be allocated to each of the storage ranks.

12. The computer program product of claim 11, further including a fifth executable portion that determines a number of TCBs for one of staging and destaging that are required by one of the storage ranks in a running state based on one of a storage rank type, one of a staging operation and destaging operation, read requests, and destage operations needed based on non-volatile storage (NVS) usage.

13. The computer program product of claim 12, further including a sixth executable portion that prevents at least a first portion of the storage ranks from increasing the TCBs until a second portion of storage ranks have decreased the TCBs for preventing a burst.

14. The computer program product of claim 11, further including a fifth executable portion that performs one of:
- freeing at least one of the TCBs by those storage ranks executing a number of the TCBs above the maximum number of the TCBs in order to execute only the maximum number of the TCBs, and
- apportioning the additional number of the TCBs from the second tier of TCBs until reaching the maximum number of the TCBs to those storage ranks executing a number of the TCBs below the maximum number of the TCBs.

* * * * *